US011261041B2

(12) United States Patent
Fehr et al.

(10) Patent No.: US 11,261,041 B2
(45) Date of Patent: Mar. 1, 2022

(54) AUTOMATED AND REMOTELY-CONTROLLED MATERIAL-CONVEYING SYSTEMS AND METHODS

(71) Applicant: AG GROWTH INTERNATIONAL INC., Winnipeg (CA)

(72) Inventors: Joel Fehr, Winnipeg (CA); Zachary Johnson, Winnipeg (CA); Erin Blomert, Winnipeg (CA); Tyler Camm, Winnipeg (CA)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 0 days.

(21) Appl. No.: 16/514,049

(22) Filed: Jul. 17, 2019

(65) Prior Publication Data

US 2020/0024087 A1    Jan. 23, 2020

Related U.S. Application Data

(60) Provisional application No. 62/699,034, filed on Jul. 17, 2018.

(51) Int. Cl.
| | | |
|---|---|---|
| *B65G 65/42* | (2006.01) | |
| *B65G 43/08* | (2006.01) | |
| *B65G 43/10* | (2006.01) | |
| *B65G 15/24* | (2006.01) | |
| *B65G 41/00* | (2006.01) | |

(Continued)

(52) U.S. Cl.
CPC ............ *B65G 65/42* (2013.01); *B65G 15/24* (2013.01); *B65G 21/14* (2013.01); *B65G 41/002* (2013.01); *B65G 41/008* (2013.01); *B65G 43/08* (2013.01); *B65G 43/10* (2013.01); *B65G 65/005* (2013.01);

(Continued)

(58) Field of Classification Search
CPC ...... B65G 65/42; B65G 65/425; B65G 65/46; B65G 65/463; B65G 65/466; B65G 65/005; B65G 33/14; B65G 33/16; B65G 33/18; B65G 41/002; B65G 41/007; B65G 41/008; B65G 21/10; B65G 21/14; B65G 15/08;

(Continued)

(56) References Cited

U.S. PATENT DOCUMENTS

| 7,191,899 B2 * | 3/2007 | Garcia, Jr. | ......... G11B 33/0422 206/308.1 |
| 8,991,585 B2 * | 3/2015 | Mast | ...................... B65G 67/24 198/313 |

(Continued)

FOREIGN PATENT DOCUMENTS

JP    2016 188814 A    11/2016

OTHER PUBLICATIONS

English Abstract and machine translation of JP2016188814A.

*Primary Examiner* — Mark A Deuble
(74) *Attorney, Agent, or Firm* — Ware, Fressola, Maguire & Barber LLP (57) ABSTRACT

A material-conveying system comprises a main conveyor for conveying material, a swing conveyor for conveying the material to the main conveyor and a processor for controlling a speed of the swing conveyor based on a feedback signal. The feedback signal may be indicative of a speed of the swing conveyor and/or a speed of a main conveyor. The feedback signal may be indicative of material level, belt slippage, flow rate, belt angle and/or material rollback.

19 Claims, 10 Drawing Sheets

(51) Int. Cl.
*B65G 65/00* (2006.01)
*B65G 21/14* (2006.01)
*B65G 65/46* (2006.01)

(52) U.S. Cl.
CPC .......... *B65G 65/425* (2013.01); *B65G 65/466* (2013.01); *B65G 2201/042* (2013.01)

(58) Field of Classification Search
CPC ........ B65G 15/22; B65G 15/24; B65G 43/04; B65G 43/08; B65G 43/10
USPC ........................................ 198/575, 592, 607
See application file for complete search history.

(56) References Cited

U.S. PATENT DOCUMENTS

| | | | |
|---|---|---|---|
| 2013/0048465 A1* | 2/2013 | Friesen ................ | B65G 41/002 |
| | | | 198/313 |
| 2014/0086721 A1* | 3/2014 | Wehrle .................. | B65G 67/24 |
| | | | 414/809 |
| 2014/0343723 A1* | 11/2014 | Meier .................. | B65G 41/002 |
| | | | 700/230 |
| 2016/0376107 A1* | 12/2016 | Beaujot .................. | B65G 43/08 |
| | | | 177/1 |
| 2017/0334650 A1* | 11/2017 | Buckmeier .......... | B65G 41/008 |
| 2019/0092576 A1* | 3/2019 | Rempel .................. | B65G 23/44 |
| 2020/0140202 A1* | 5/2020 | Grose .................. | A01C 15/003 |

\* cited by examiner

AUTOMATED AND REMOTELY-CONTROLLED MATERIAL-CONVEYING SYSTEMS AND METHODS

CROSS-REFERENCE TO RELATED APPLICATIONS

This application claims priority from U.S. Provisional Patent Application 62/699,034 filed Jul. 17, 2018.

TECHNICAL FIELD

The present invention relates generally to material-conveying systems and, more particularly, to agricultural material-conveying systems.

BACKGROUND

In the agricultural industry, various types of material-conveying systems are used to load bins or silos with grain, seed, fertilizer or other such bulk materials. Frequently, a swing conveyor is used in conjunction with a main conveyor.

Optimizing the overall conveyor throughput of the swing conveyor and main conveyor is challenging. Typically, the main conveyor speed is set by changing a power takeoff (PTO) speed, and the swing conveyor speed is then set manually independently. Often the operator sets this once and does not bother to seek to optimize the speeds because there is no easy way to do so. Moreover, for each different commodity, and potentially each different load, there could be a different set point for the swing and main conveyor speeds. Compounding this problem is that often there is no straightforward means of determining their operating points because there is no display of speed or other useful feedback.

In view of the foregoing, an improved material-conveying system is highly desirable in order to address the shortcomings of the prior art.

SUMMARY

In general, the present invention provides systems and methods for automatically and remotely controlling a swing conveyor to optimize, or at least improve, the performance of the swing conveyor in conveying material such as grain or seed to a main conveyor.

One aspect of the present invention is a system that includes a main conveyor for conveying material, a swing conveyor for conveying the material to the main conveyor and a processor for controlling a speed of the swing conveyor based on a feedback signal. In one implementation, the feedback signal may be a speed of the main conveyor.

Another aspect of the present invention is a material-conveying system comprising a main conveyor for conveying material, a swing conveyor for conveying the material to the main conveyor, a main conveyor speed sensor to sense a speed of the main conveyor and a swing conveyor speed sensor to sense a speed of the swing conveyor. The system includes a mobile device having a memory for storing instructions in computer-readable code and a processor coupled to the memory for executing the code to cause the mobile device to display a graphical user interface that is programmed to receive user input specifying a target speed of the main conveyor and/or a target speed of the swing conveyor or to receive a target ratio of the speed of the main conveyor to the speed of the swing conveyor. The system also includes a conveyor controller configured to receive a wireless signal from the mobile device and to control the speed of the main conveyor and/or the speed of the swing conveyor to achieve the target speeds or target ratio.

Yet another aspect of the present invention is a method of operating a swing conveyor that conveys material to a main conveyor. The method entails acts, steps or operations of sensing a material-conveying performance characteristic of the main conveyor, generating a feedback signal based on the performance characteristic, receiving the performance characteristic by a conveyor controller and controlling, using the conveyor controller, the speed of the swing conveyor in response to the feedback signal.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
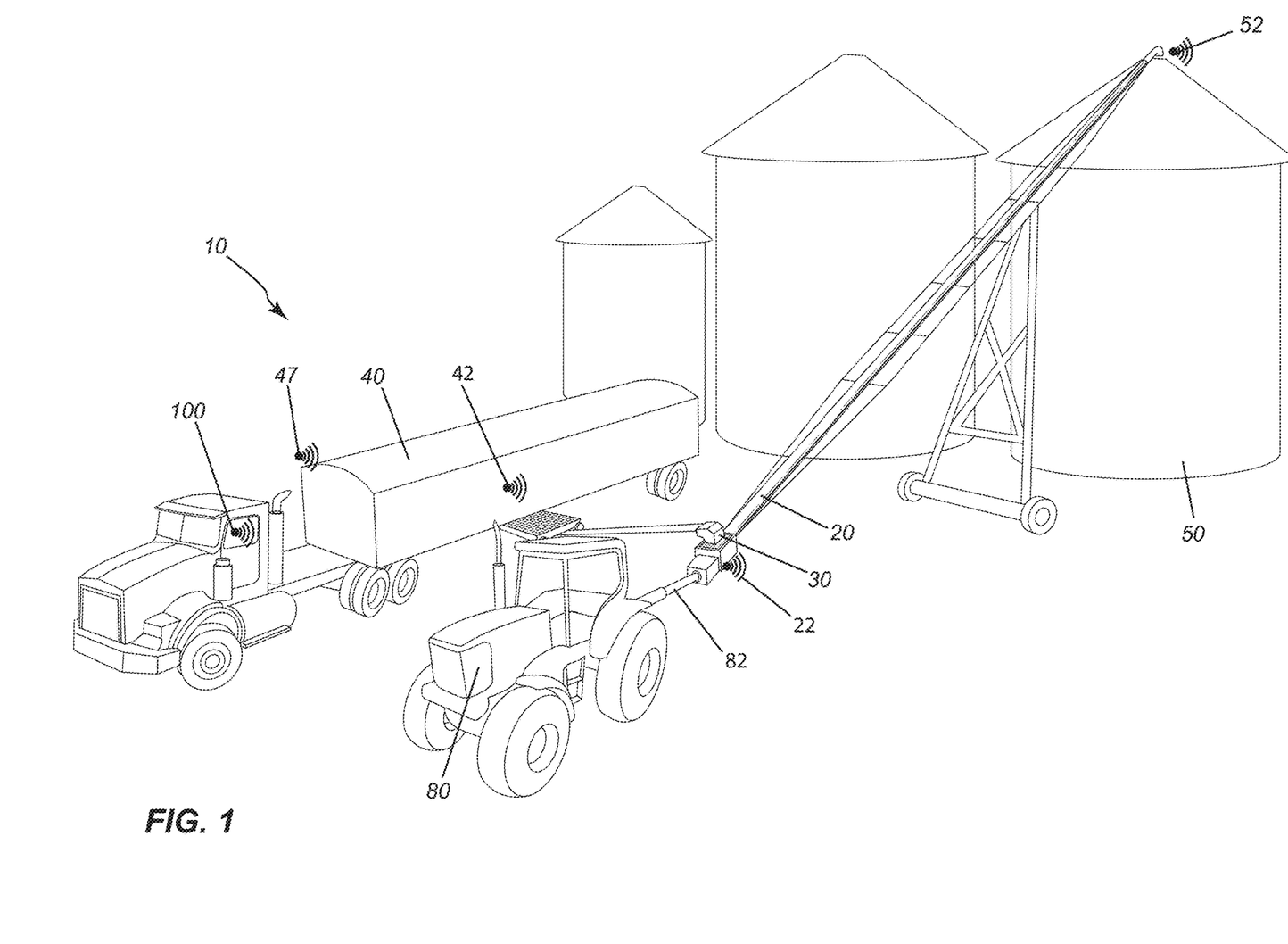
FIG. 1 illustrates a material-conveying system for transferring a material such as grain from a truck to a bin.

FIG. 1 depicts a material-conveying system, generally designated by reference numeral 10, in accordance with an embodiment of the present invention. The material-conveying system 10 includes a main conveyor 20 and a swing conveyor 30.

The material-conveying system 10 illustrated by way of example in FIG. 1 is a belt conveyor system for grain handling although it will be appreciated that the present invention may be applied to other agricultural material-conveying systems for conveying grain, seed, or other such particulate material. The system 10 is, in one embodiment, remotely controllable.

The system 10 depicted by way of example in FIG. 1 is designed to convey grain, seeds or other bulk agricultural material. As shown in FIG. 1, the main conveyor 20 may receive grain from the swing conveyor 30 onto which grain is discharged from a truck 40 or other transportable or fixed material container such as a wagon, train car, cart, bin, etc. The grain is conveyed from the swing conveyor onto the main conveyor (or via a transition hopper) and thereafter into a grain bin 50 or silo for drying, aeration and storage.

Figure 2:
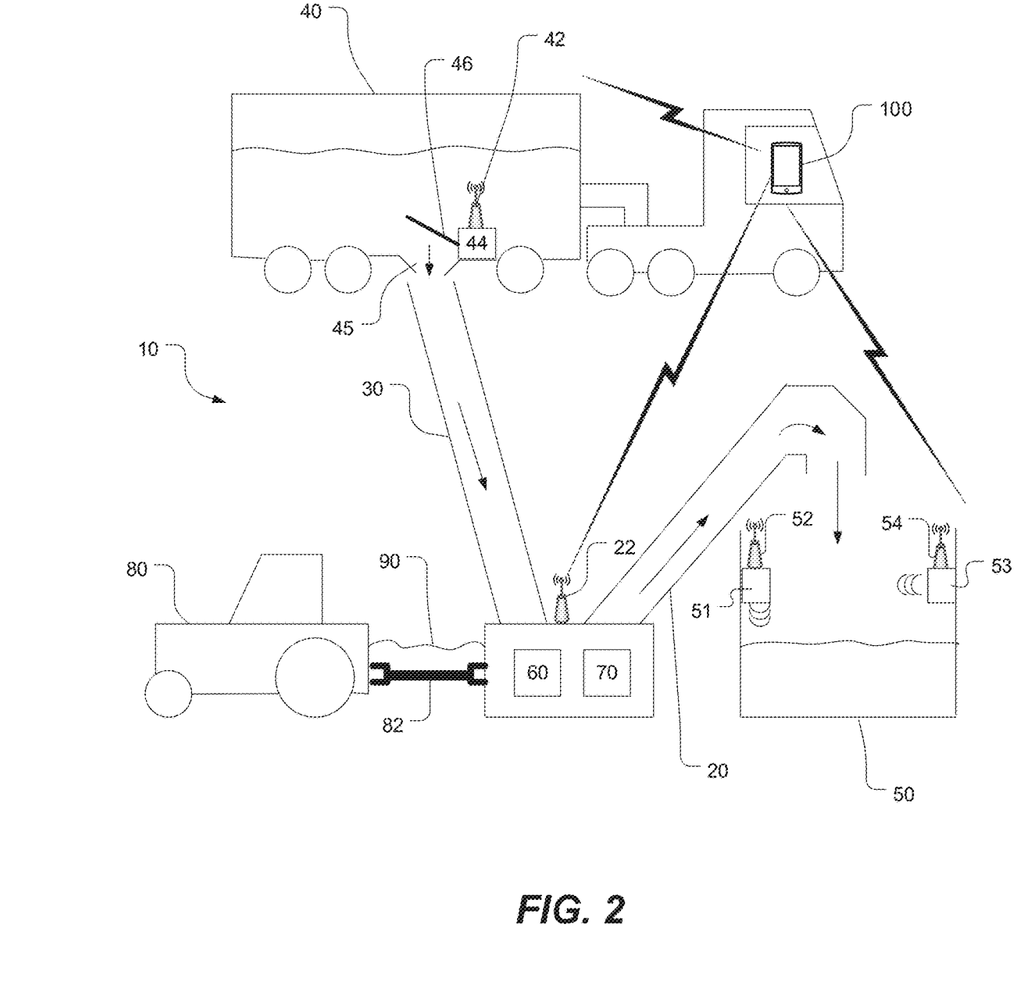
FIG. 2 is a schematic depiction of a material-conveying system transferring material from a truck to a bin.

The material-conveying system 10 optionally includes, in addition to the main conveyor 20 and the swing conveyor 30, an electronic control unit 60 mountable or otherwise connectable to the system 10 and a user interface control panel 70 as shown for example in FIG. 2 mountable to the system so as to be interfaced with the electronic control unit 60 to receive user input commands to control the system 10, i.e. both the main conveyor 20 and the swing conveyor 30. Optionally, the system 10 further includes a power unit 80 which may be mechanically connected via a PTO driveline or driveshaft 82 to the main conveyor for powering the main conveyor. The system 10 may also include a data bus 90 connected between the power unit and the electronic control unit. Optionally, the system 10 further includes a portable remote control device 100 (which is also referred to herein as a portable remote control interface or portable remote control unit or handheld wireless controller) for wirelessly controlling the power output of the power unit to the material-conveying apparatus.

In some embodiments, the power unit 80 is a tractor PTO and the data bus is an ISOBUS (i.e. a data bus compatible with the standard set forth in ISO 11783). The data bus provides a data communication link between the tractor and the electronic control unit. However, any other suitable wired or wireless data connection may be employed to transfer data from the electronic control unit to the tractor.

FIG. 2 is a schematic depiction of the material-conveying system 10 transferring material from a truck 40 to a bin 50. Although a truck and fixed bin are illustrated, the truck may be generally any material container and the bin may be generally any other material container so that, in general terms, the transfer of material is from a first material container to a second material container. In FIG. 2, the material-conveying system 10 includes the main and swing conveyors 20, 30 for conveying material and optionally includes an electronic control unit 60 for controlling the speeds of the conveyors 20, 30. A user interface control panel 70 is connected or wired to the electronic control unit 60 to receive user input commands to control the system 10. In some embodiments, the control panel controls a power unit 80, e.g. a tractor PTO. This control panel 70 enables a user to operate the system 10 with direct manual input. This control panel 70 also serves as a useful backup input device in case the portable remote control device 100 is misplaced, malfunctions or the battery is dead. The system 10 may include a power unit 80, e.g. a tractor PTO, mechanically coupled to the main conveyor 20 via a PTO driveline or driveshaft 82 for powering the main conveyor 20. The system 10 may include a data bus 90, e.g. an ISOBUS, communicatively connected between the power unit 80 and the electronic control unit 60. The system 10 includes a portable remote control device 100 for wirelessly transmitting command signals for remotely controlling a power output of the power unit 80 to the main conveyor 20. The system 10 includes a wireless receiver 22 at, or connected to, the system 10 for receiving the command signals from the portable remote control device 100 and for transmitting the command signals to the electronic control unit 60 that controls the power output of the power unit 80. The wireless receiver 22, electronic control unit 60 and control panel 70 may be mounted to the main conveyor or the swing conveyor.

Figure 3:
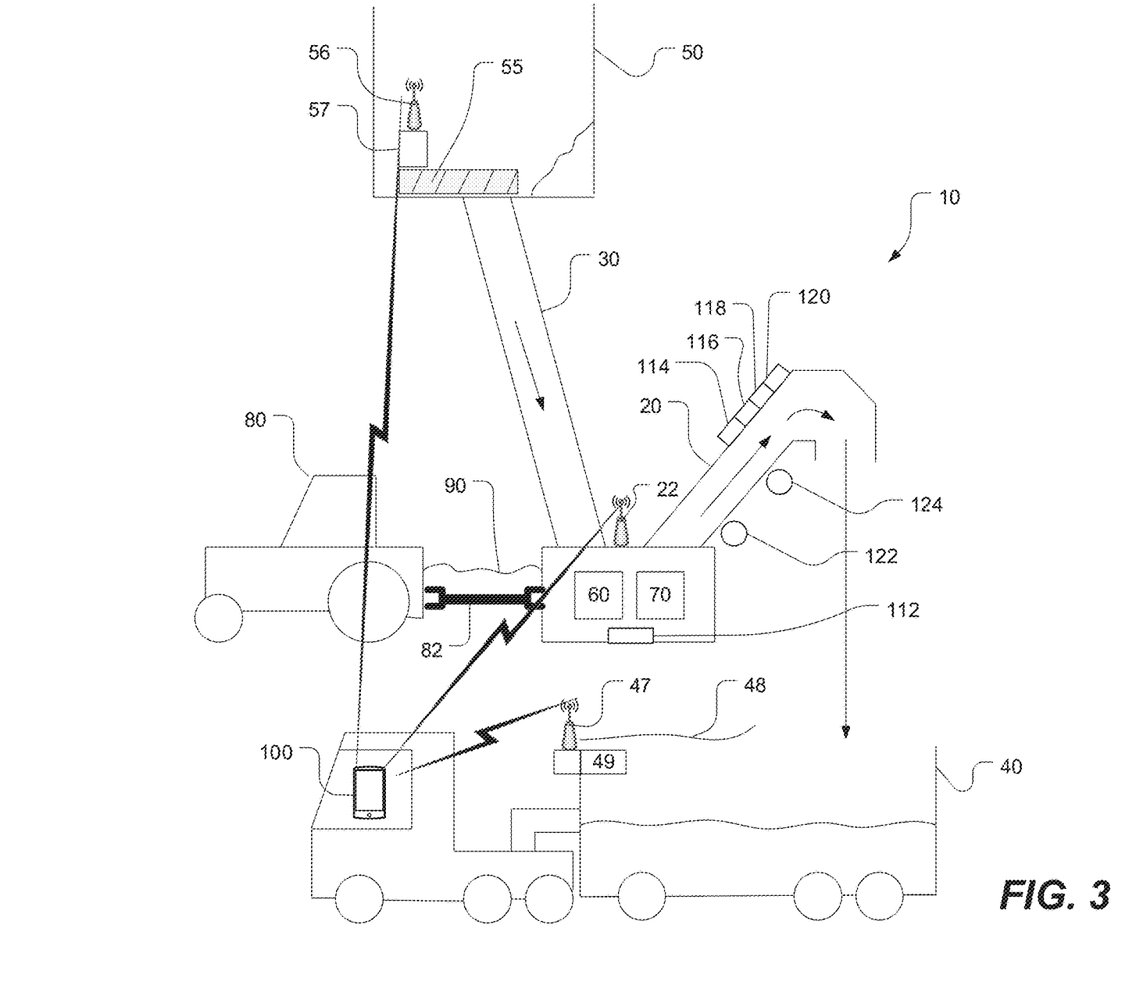
FIG. 3 is a schematic depiction of a material-conveying system transferring material from a bin to a truck.

Optionally, the system may include a material-displacement sensor for sensing displacement of material and for sending a material-displacement signal to the electronic control unit to automatically control the power output to the material-conveying system. The material-displacement sensor may be a material flow sensor, a visual sensor (e.g. camera), a vibration sensor, a sound sensor for sensing the characteristic sound of flowing material, or a torque meter for measuring the load on the system or on the drive shaft. The sensor signal may be used by the electronic control unit to adjust the speed of the conveyor by regulating the power output to the conveyor. Adjusting the speed also includes activating (turning on) the power output to the PTO when material flow into the system is detected or deactivating (shutting off) the power output by the PTO when material flow into the system ceases. Although the material-conveying system 10 may be used to load a bin or silo as shown in FIG. 2, the material-conveying system may also be used to unload a bin or silo, e.g. to load a truck as shown by way of example in FIG. 3.

Figure 4:
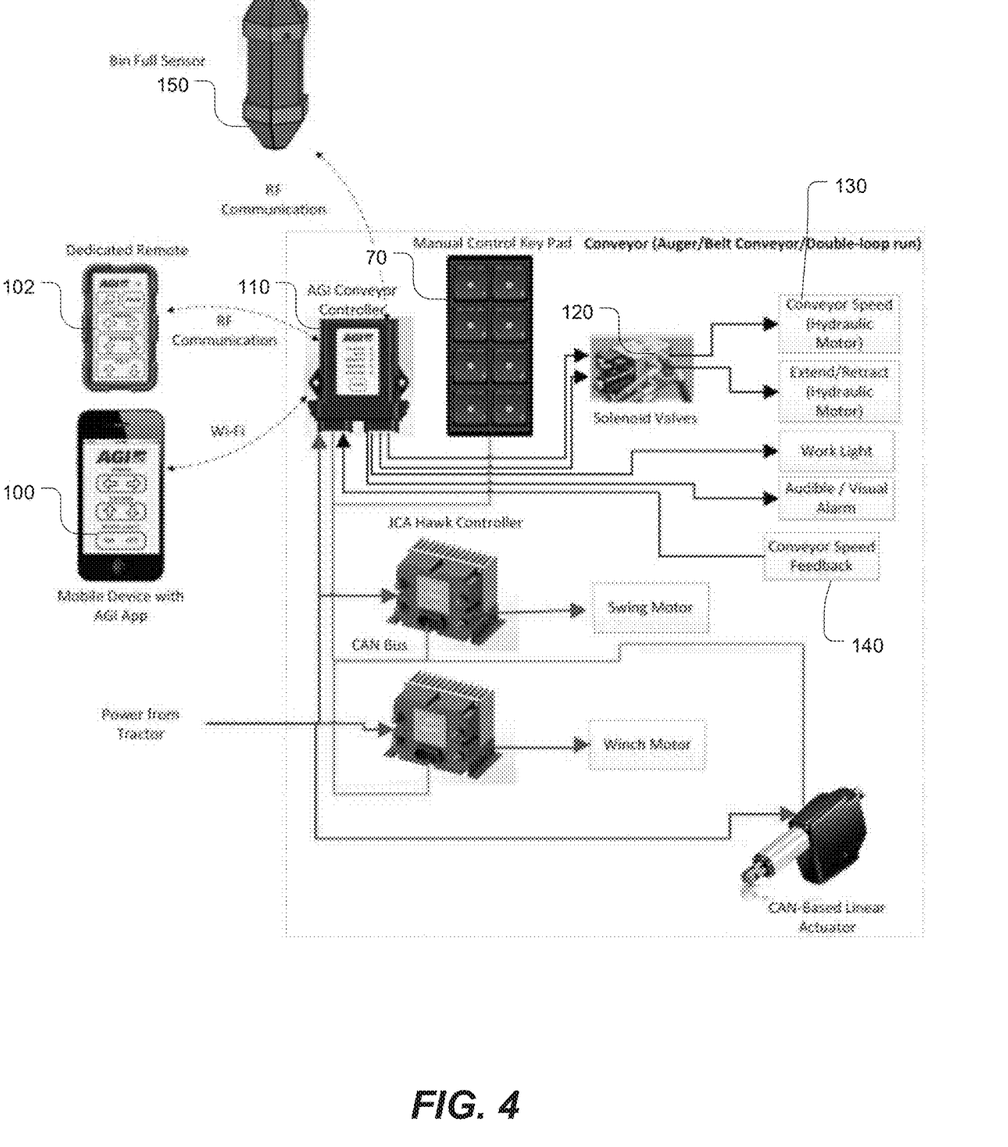
FIG. 4 depicts a material-conveying system in accordance with an embodiment of the present invention.

FIG. 4 depicts a material-conveying system in accordance with an embodiment of the present invention. The system is user-controlled via one or more portable remote control devices 100, 102 and a manual keypad 70 as will be described in greater detail below. In the embodiment depicted in FIG. 4, the system includes a conveyor controller 110 that is configured to control a conveyor speed by controlling a solenoid valve 120 which in turn controls a speed of a hydraulic motor 130 of the conveyor. The conveyor controller 110 is communicatively connected to a conveyor speed sensor 140. The conveyor controller 110 may implement a feedback control algorithm to adjust the solenoid valve 120 based on the signals received from the conveyor speed sensor 140. The conveyor controller 110 is wirelessly connected to one or more portable remote control devices 100, 102 as noted above. The portable remote control device may be a mobile device (e.g. smart phone) 100 running a software application that causes the mobile device to present a graphical user interface for a user to provide user input and to display output information about the conveyor. Alternatively, the portable remote control device may be a dedicated remote 102. In the embodiment depicted in FIG. 4, the conveyor controller 110 is also connected to a manual keypad 70 to permit direct manual control by a user standing at the conveyor. The conveyor controller 110 may also be wirelessly connected to one or more wireless sensors such as a wireless bin sensor 150 as shown by way of example in this figure. The conveyor controller 110 may be a processor (e.g. a microprocessor or a microcontroller).

The system may include a sensor to sense a performance characteristic of the main conveyor and generate a feedback signal for the conveyor controller or processor to use in controlling the speed of the swing conveyor. If the sensor is a speed sensor, the performance characteristic is the speed of the main conveyor. The sensor may be a belt slippage sensor 118 to sense belt slippage. The sensor may be a conveyor angle sensor to sense conveyor angle. The sensor may be a material sensor such as optical sensor 120 or camera to detect material level or material rollback.

In another embodiment, the conveyor controller 110 may adjust the speed of the swing conveyor based on multiple performance characteristics from multiple sensors.

Figure 5:
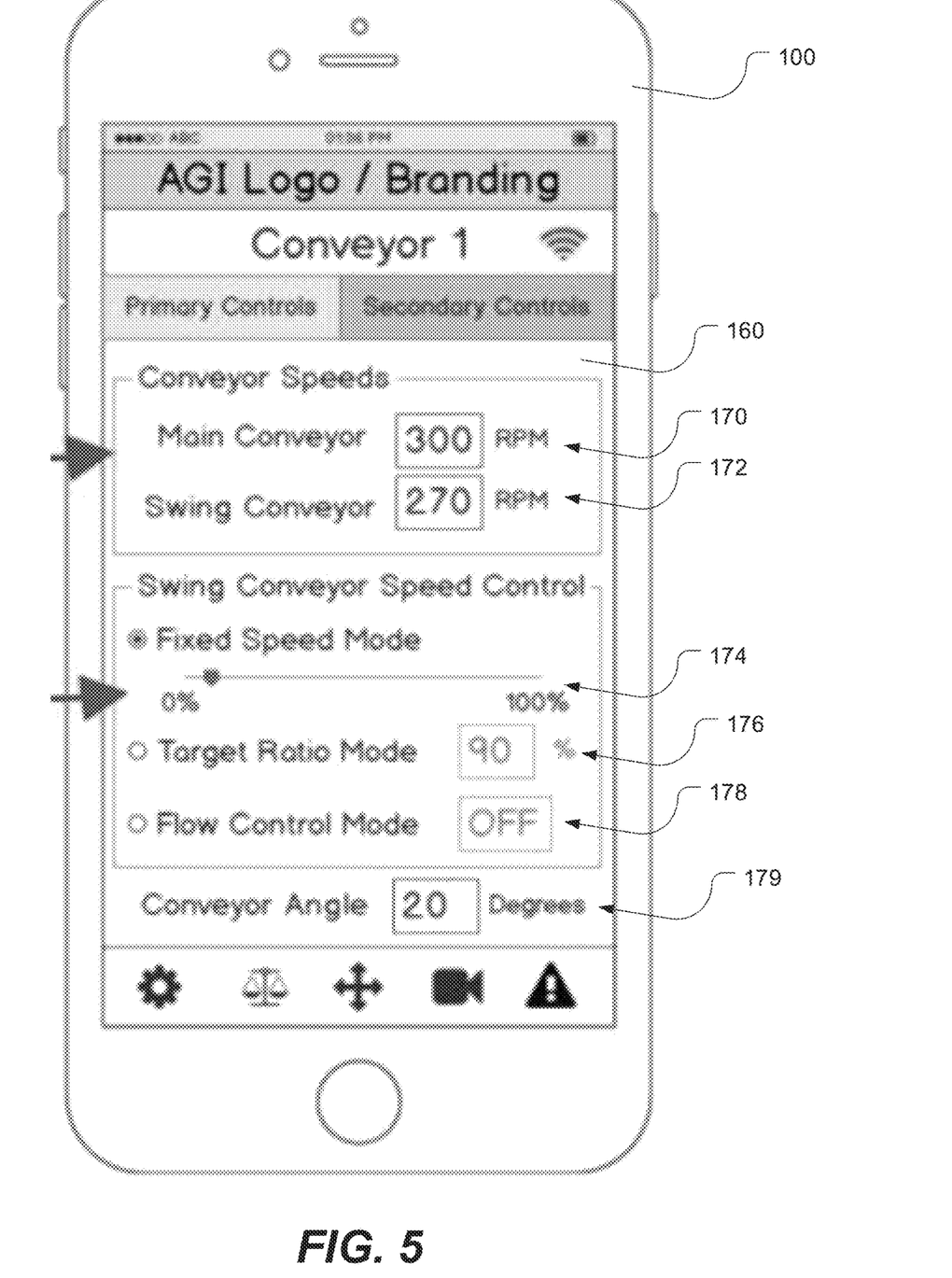
FIG. 5 depicts a mobile device displaying a graphical user interface to remotely control the material-conveying system.

FIG. 5 depicts a mobile device 100 having a display screen 160, e.g. a touch-sensitive display screen, for displaying a graphical user interface to remotely control the material-conveying system. Specifically, the mobile device 100 can be used to control the speeds of the main conveyor and swing conveyor. The mobile device may display virtual buttons in the form of user-selectable interface elements to control conveyor speeds or a ratio of the speeds. The mobile device 100 shown by way of example in FIG. 5 may be a smart phone, tablet, or any other equivalent wireless communications device. The mobile device 100 may use its touch-sensitive display screen 160 to display conveyor information, such as conveyor speed, and to present virtual conveyor controls and also to receive user input via the virtual conveyor controls. User input may also, or alternatively, be provided by verbal commands that are translated by a speech recognition module of the mobile device. In the exemplary embodiment depicted in FIG. 5, the mobile device 100 displays on its display 160 a main conveyor speed readout 170 and a swing conveyor speed readout 172 as measured by main and swing conveyor speed sensors. The main and swing conveyor speeds may be expressed in RPM as shown or in any other suitable units such as feet per minute (fpm). The main conveyor speed may be set using the feedback of the measured main conveyor speed. For example, the user can use the speed readout 170 of the main conveyor to manually increase or decrease the speed of the PTO that drives the main conveyor. The swing conveyor speed may be set either (i) manually using the swing conveyor speed (as shown by the speed readout 172 of the swing conveyor) as feedback to the user; (ii) automatically based on a user-specified ratio to the main conveyor speed or (iii) automatically based on a control loop that seeks to maintain a hopper level between a minimum level and a maximum level as determined by level sensors (which is referred to herein as "flow control mode").

In the exemplary embodiment depicted in FIG. 5, the mobile device 100 also displays a swing conveyor speed control interface. This interface may include a fixed speed mode slider 174 to enable the user to slide the virtual slider to any value between 0 and 100% although in another variant the range may be from to a value greater than 100%. This percentage represents a ratio of the swing conveyor speed to the main speed conveyor. For example, if the main conveyor is set to run at 300 RPM, and the user slides the slider to 90%, the swing conveyor will thus be set to run at 90% of 300 RPM which is thus 270 RPM. In other variants, the speed can be expressed in other units, e.g. feet per minute (fpm). The mobile device may also be configured to display a target ratio mode field 176 enabling the user to specify a target ratio of the main conveyor and swing conveyor speeds. When running in target ratio mode, the conveyor controller maintains the ratio of the speeds of the main and swing conveyors. The mobile device also displays a flow control mode selector 178 to enable the user to engage the flow control mode in which the conveyor controller varies the speed of the swing conveyor based on a level of grain or other material in a transition hopper between the swing conveyor and the main conveyor. The hopper includes two level sensors 112 (a minimum level sensor and a maximum level sensor) that provide signals when the material level in the hopper reaches either the lower or upper limit, The level sensors 112 thus ensure that the swing conveyor is not overfeeding or underfeeding the main conveyor. Alternatively, a target flow rate can be set based on a signal from a material flow rate sensor 114. In the exemplary embodiment of FIG. 5, the mobile device 100 is configured to display a conveyor angle readout 179 for displaying a readout of a conveyor angle that is measured by a conveyor angle sensor 116. It will be appreciated that FIG. 5 presents one specific example interface and that other interfaces may include only one or a subset of these control elements. The mobile device 100 may thus have fewer user-selectable interface elements than shown or more user-selectable interface elements than shown. The layout and type of the user-selectable interface elements may also be varied. The display presentation may also be user-configurable based on user settings or preferences.

In response to receiving user input, a processor of the mobile device 100 interacts with a radiofrequency transceiver of the mobile device to wirelessly transmit a command to a wireless receiver at the conveyor controller 110. Any suitable short-range wireless communication protocol may be utilized for transmitting the commands, e.g. Bluetooth®, ZigBee® RF4CE (Radio Frequency for Consumer Electronics), Wi-Fi™, Z-Wave or equivalent. For example, a ZigBee® RF4CE remote control system compliant with the IEEE 802.15.4 standard operates in the 2.4 GHz frequency band and provides bi-directional communication. Bluetooth® operates in the range of 2400-2483.5 MHz. Line-of-sight control may also be effected using infrared. The remote control device may also operate in the radio frequency band of 27 MHz or 49 MHz. As will be appreciated, any suitable RF band may be used to effect remote control of the conveyor system.

As shown in FIG. 5, the portable remote control device 100 may be implemented as a wireless communications device or mobile communications device having a software application executed by a processor of the device 100 that cooperates with a short-range wireless transceiver, e.g. a Bluetooth® chip, to transmit command signals to the electronic control unit. The portable remote control device 100 may be paired, registered or linked with the wireless receiver to ensure that the portable remote control device 100 only controls the one desired apparatus and not another nearby apparatus by mistake (as multiple devices may be used in the same vicinity to control different apparatuses). The device may be configured to automatically disconnect the link when the device strays a certain distance from the receiver. The application may be downloaded and installed on any wireless communications device or mobile device such as a smart phone, cell phone, personal digital assistant (PDA), tablet, laptop, notebook, etc. The software application is a computer program embodied as a computer-readable medium that contains, stores, communicates, propagates or transports the program for use by or in connection with the processor or other instruction-execution component of the device. The computer-readable medium may be electronic, magnetic, optical, electromagnetic, infrared or any semiconductor system or device. For example, computer-executable code may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware or firmware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

Figure 6:
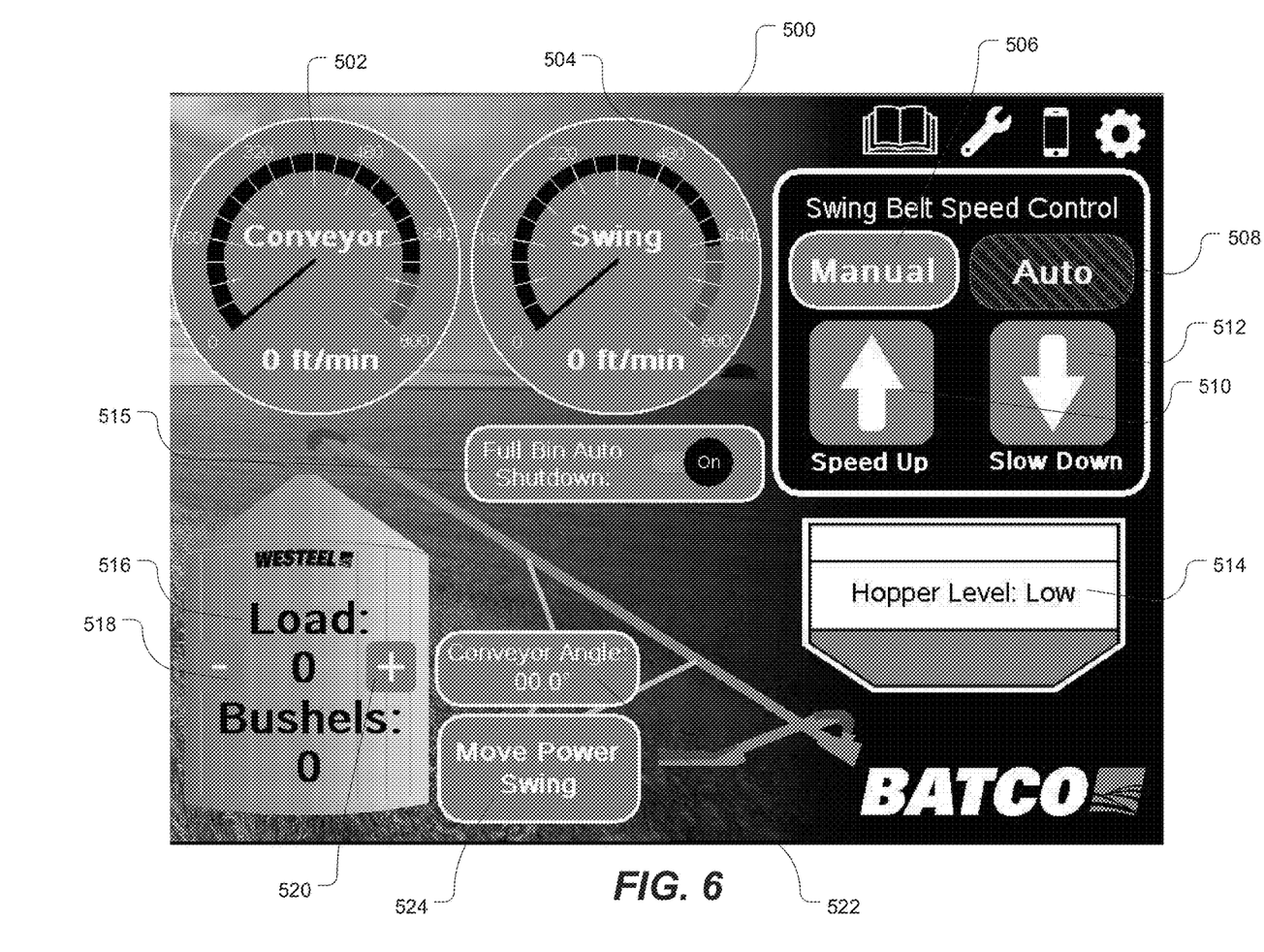
FIG. 6 depicts another example of a graphical user interface for controlling the material-conveying system.

The display of the mobile device 100 may present a graphical user interface (GUI) 500 as depicted by way of example in FIG. 6. This GUI is a main screen in one embodiment. In this example, the GUI 500 presents virtual dial-type gauges 502, 504 for conveyor speed and swing conveyor speed, respectively. This example GUI 500 presents a virtual panel for the swing belt speed control. The panel comprises user interface elements defining a manual button 506 and an automatic button 508 to enable the user to select manual or automatic speed control. When operating in manual mode, the panel comprises user interface elements defining a speed up button 510 and a slowdown button 512. The GUI of FIG. 6 may include a hopper level display 514 showing the level of material in the hopper. The GUI of FIG. 6 may include a full bin auto shutdown toggle to enable the user to set the system to automatically shut down when the bin is full. The GUI of FIG. 6 may include a virtual load/bushel panel 516 with user interface elements 518, 520 defining plus (+) and minus (−). The GUI of FIG. 6 may include a conveyor angle display 522 and a user interface element to move the power swing conveyor 524.

Using an application running on a mobile device, the user can thus press virtual buttons on the mobile device display screen or on a separate HMI (human-machine interface) mounted, for example, to the conveyor to control forward/reverse of the power swing conveyor. The application on the mobile device can also synchronize the swing conveyor belt speed to the main conveyor belt speed. This may be implemented by utilizing an encoder on driven roller and a proportional control valve on swing drive. Optionally, the application can present a button to automatically adjust the swing conveyor speed belt to match the main conveyor speed or to match a customizable percentage of the main conveyor speed. Optionally, the application can provide recommendations for this percentage based on grain type, angle, or other factors. Optionally, the application can provide a setting to automatically speed up or slow down the swing conveyor belt speed based on a fill level.

Figure 7:
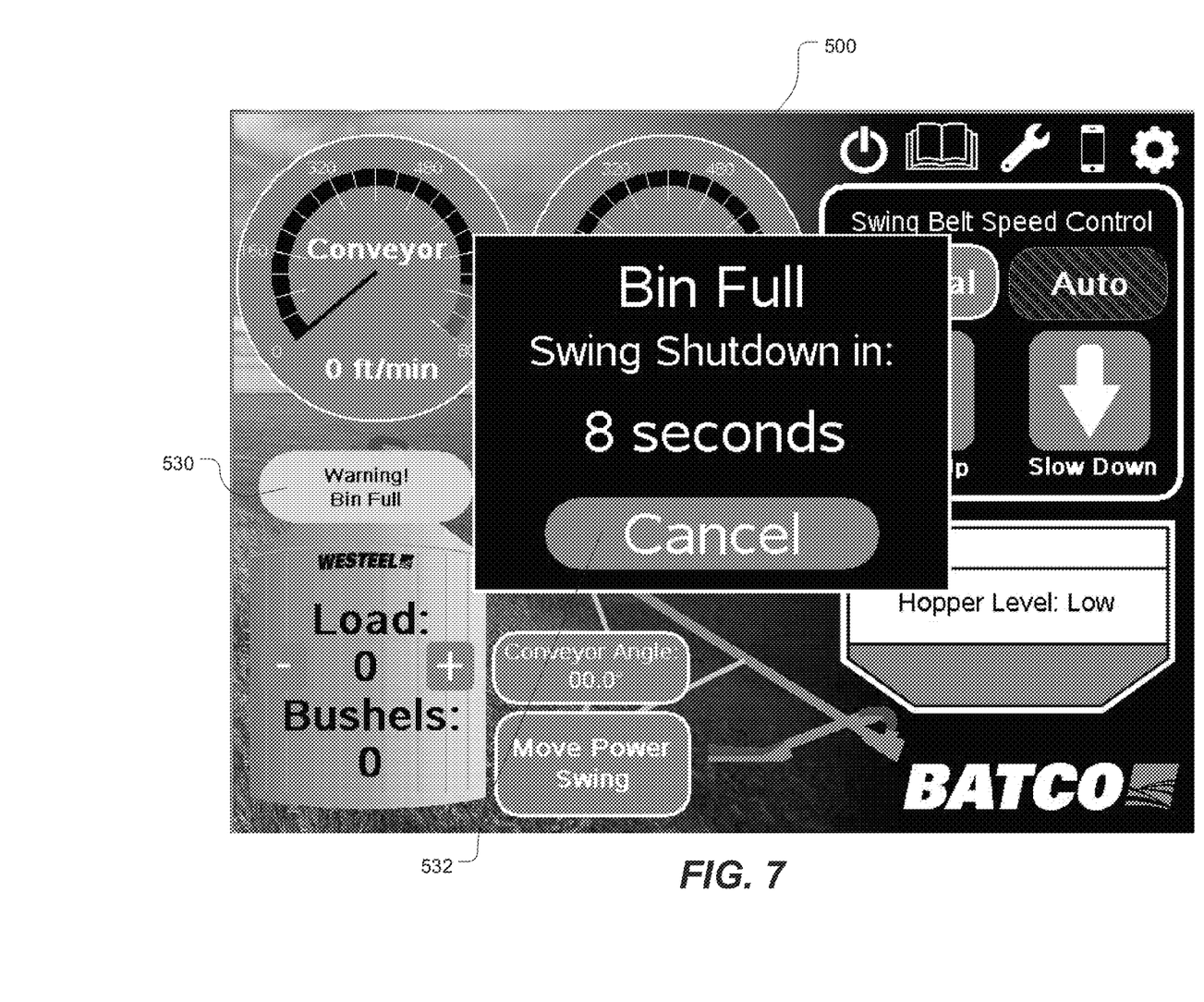
FIG. 7 depicts yet another example of a graphical user interface for controlling the material-conveying system.

FIG. 7 depicts the GUI 500 of FIG. 6 after the system has detected that the bin is full. In this situation, the GUI 500 may present a warning 530. If the auto shutdown was selected, then a window is displayed as shown indicating that the swing conveyor is about to be shut down. In this example, there is a countdown of the seconds remaining before shutting down. In this example, there is a cancel button 532 to enable the user to cancel the automatic shutdown of the swing conveyor.

Figure 8:
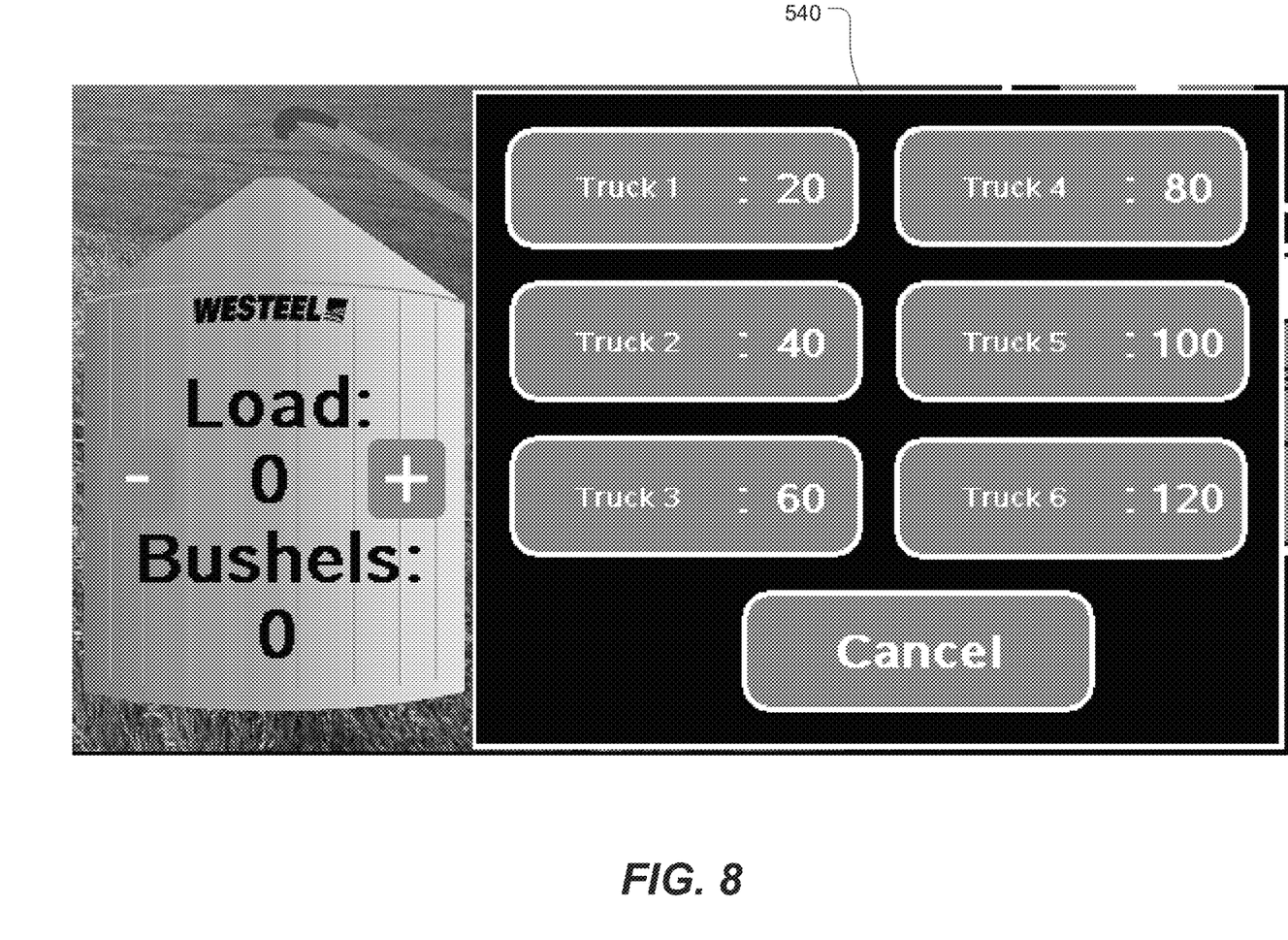
FIG. 8 depicts a further example of a graphical user interface for controlling the material-conveying system.

FIG. 8 depicts another GUI 540 that presents a load/bushel counter for monitoring and managing delivery to and from trucks. The interface enables the user to input and save the amount of bushels for a plurality of trucks. In the specific example, the interface provides up to six customizable trucks. The user can thus select which truck the user is currently emptying. In another implementation, the user inputs and saves the maximum bushels/bin and the application generates and outputs a warning when the load in truck that the user has selected will not fit in the remaining space left in the bin. In another implementation, the application displays a bin fill animation as the bin is being filled. In another implementation, the application can provide similar information and functionality when emptying the bin into multiple trucks.

In one embodiment, the processor of the conveyor system, or the app executed by the processor, is configured to provide a bushel-per-minute (BPM) calculator that provides a readout of how many bushels per minute the conveyor is moving. This BPM calculator can also show the efficiency and capacity of the conveyor system. The processor can also implement a bushel counter that tracks how many bushels came off the truck and/or how many bushels are in the bin using the BPM calculator. The processor can also implement a grain tracking system that uses the bushel counter to enable the user to log and track how many bushels are in each bin and what type of grain is in that bin.

Optionally, the application enables the user to enter a bin size and how many truckloads have been loaded to estimate how full the bin is getting. Alternatively, the application could automatically estimate the fill level based on swing movement or the belts starting/stopping.

Figure 9:
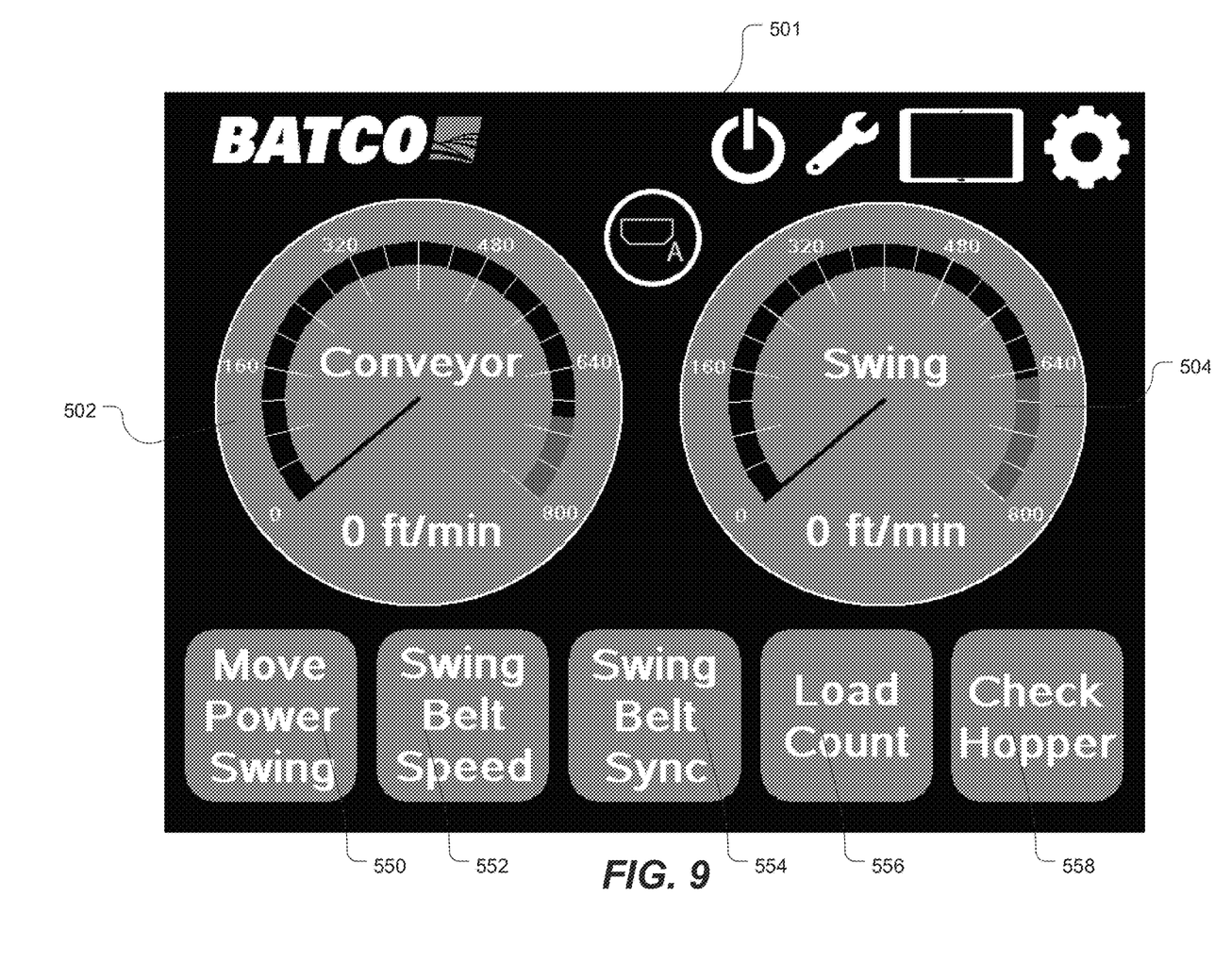
FIG. 9 depicts yet a further example of a graphical user interface for controlling the material-conveying system.

FIG. 9 depicts another GUI 501 designed especially for a mobile device. The GUI 501 includes the virtual dial-type gauges 502, 504 shown in FIG. 6 and also includes user interface elements 550, 552, 554, 556, 558 to perform the following functions, respectively: move the power swing, set the swing belt speed, synchronize the swing belt with the main conveyor, view the load count and check the hopper. In one embodiment, the belt speed can be synchronized with the conveyor angle. Based on the type of grain and the angle of the conveyor, the processor adjusts the speed of the conveyor belt automatically to achieve the optimal performance. Alternatively, instead of automatic adjustment, the GUI can display a notification whether to speed up or slow down.

Figure 10:
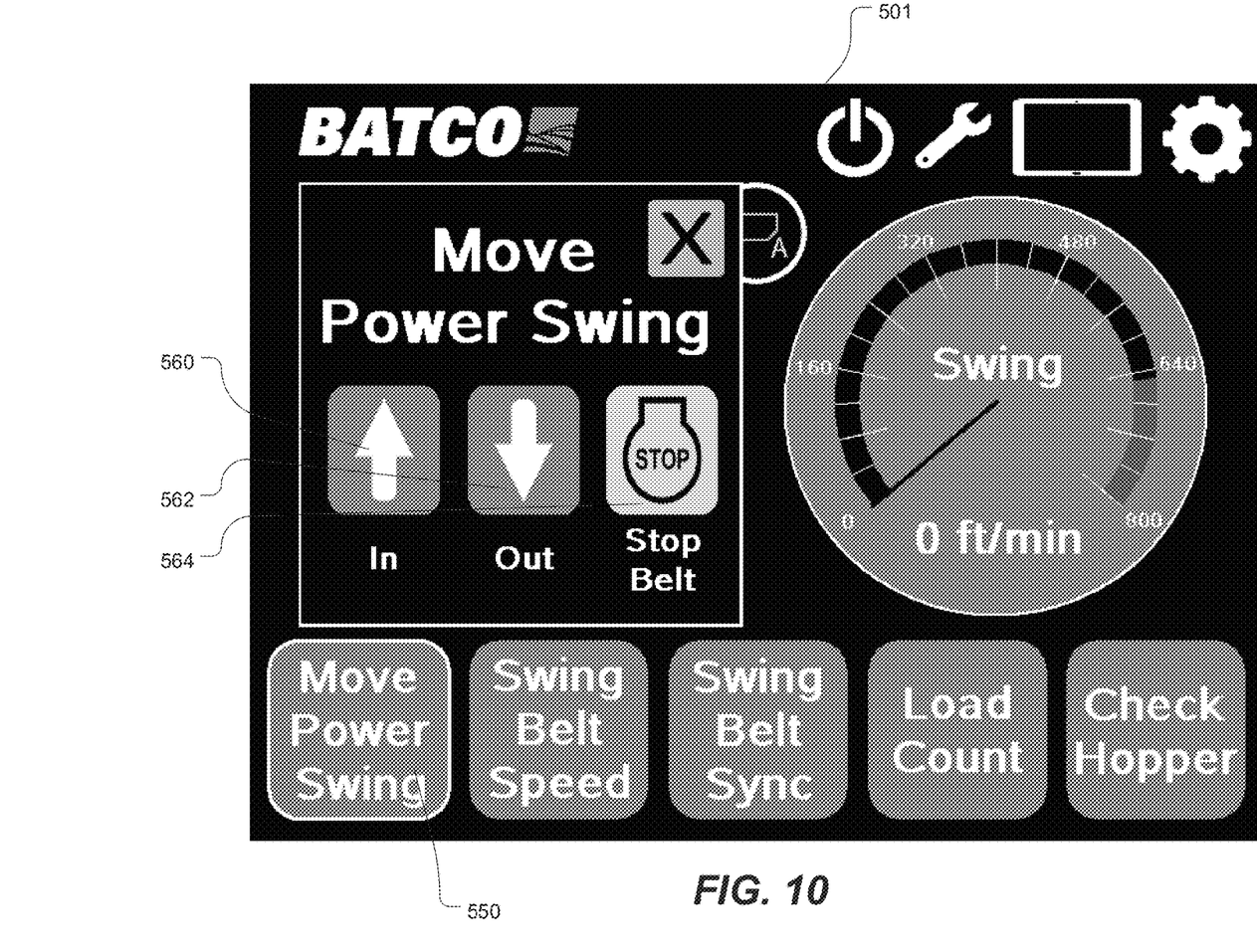
FIG. 10 depicts another example of a graphical user interface for controlling the material-conveying system.

FIG. 10 depicts the GUI 501 after the user has selected the move power swing button 550. The GUI 501 presents a move power swing window that contains user interface elements 560, 562, 564 to perform the following functions respectively: move the power swing in, move the power swing out and stop the belt.

From these or other graphical user interfaces displayed on a mobile device such as a phone or tablet, the user is able to remotely control, manage and monitor various conditions and aspects of the material-conveying system. The system may include various sensors and one or more microprocessors or microcontrollers to implement feedback control systems to automatically control operating parameters in response to sensed conditions. In one embodiment, there is a single microprocessor to control all of the functions of the conveyor. The microprocessor (or simply processor) may execute a software code defining the control algorithms. The software application may be embodied as a computer-readable medium that includes computer instructions in code which when stored in a memory and executed by the processor cause the processor to control various functions or aspects of the conveyor system as will be further described below. The software code may be programmed in any suitable language, whether object-oriented or not, e.g. Java, Javascript, PHP, C#, Objective-C, .NET (Visual C++), Perl, Ruby, etc.

In one specific implementation, the system may utilize feedback from cameras and/or sensors on one or both conveyors to measure characteristics such as grain level, belt slippage, flow rate, angle, product rollback to adjust the speed of each conveyor automatically or to provide an output to enable the user to adjust the speed manually. The system may automatically control the speed of the main conveyor based on a user setting and/or based on sensed conditions. The system may alternatively control the speed of the swing conveyor relative to the main conveyor. The system may also control the gate opening from the truck (for filling the bin) or the hopper (for bin unload) to keep the swing hopper full. Belt speed may be determined using an encoder on the driven roller.

In one embodiment, the system is configured to provide a belt slippage warning, an angle warning (which is dependent on the type of commodity being conveyed). The system may include an accelerometer to measure the conveyor angle. Belt slippage may be determined using an encoder 122 on the drive roller and an encoder 124 on the driven roller and by comparing the driven roller speed to the drive roller speed.

In another aspect, the system may be configured to enable the user to manage loads. The system may provide a load management interface to enable the user to add and remove bulk amounts to and from a digital representation of the bin. The system may be configured to automatically add/remove a volume from the bin based on time and flow rate from the conveyor. The system may be configured to predict when the bin will be full or empty based on flow rate and time. In one embodiment, the conveyor system includes swing hopper base sensors (which may include seed sensors and limit switches). Level sensors and fill/rollback sensors can, in one specific embodiment, provide feedback signals to the processor of the conveyor system to enable the processor to control the speed of the conveyor. For example, in one specific embodiment, the system can control the swing belt speed using a proportional control valve. In one embodiment, a visual indicator on a mobile device display screen can indicate how much to open the gate on the truck.

The embodiments of the invention described above provide an improved system for handling grain or other such material. The system provides improved automation and efficiency of operation.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:

1. A material-conveying system comprising:
   a main conveyor for conveying material;
   a swing conveyor for conveying the material to the main conveyor via a transition hopper;
   a material level sensor for sensing a material level of the material in the transition hopper;
   one or more additional sensors selected from a group consisting of a material flow rate sensor to sense a flow rate of the material, a belt slippage sensor to detect belt slippage, a conveyor angle sensor to sense a conveyor angle, and an optical sensor to detect material rollback; and
   a processor configured to control one or both of a speed of the swing conveyor and a speed of the main conveyor based on one or more feedback signals from the material level sensor and the one or more additional sensors.

2. The system of claim 1, wherein the one or more additional sensors comprises only the material flow rate sensor.

3. The system of claim 1, wherein the one or more additional sensors comprises only the belt slippage sensor.

4. The system of claim 3, wherein the belt slippage sensor comprises an encoder on a drive roller and another encoder on a driven roller to enable a comparison of a driven roller speed to a drive roller speed.

5. The system of claim 1, wherein the one or more additional sensors comprise only the conveyor angle sensor.

6. The system of claim 1, wherein the one or more additional sensors comprise only the optical sensor.

7. The system of claim 1, wherein the system further comprising a mobile device having a memory for storing instructions in computer-readable code and a processor coupled to the memory for executing the code to cause the mobile device to display a graphical user interface to receive user input specifying a target speed of the main conveyor and a target speed of the swing conveyor or specifying a ratio of the speed of the main conveyor to the speed of the swing conveyor, or specifying an automatic mode to automatically control the conveyor speeds based on feedback signals.

8. The system of claim 1, wherein the swing conveyor comprises a hydraulic motor and a solenoid valve connected to the motor, wherein the solenoid valve is driven by a drive signal from the processor.

9. A material-conveying system comprising:
   a main conveyor for conveying material;
   a swing conveyor for conveying the material to the main conveyor;
   a main conveyor speed sensor to sense a speed of the main conveyor;
   a swing conveyor speed sensor to sense a speed of the swing conveyor;
   a mobile device having a memory for storing instructions in computer-readable code and a processor coupled to the memory for executing the code to cause the mobile device to display a graphical user interface that is programmed to receive user input specifying a target speed of the main conveyor and a target speed of the swing conveyor or to receive a target ratio of the speed of the main conveyor to the speed of the swing conveyor, wherein the code also provides recommendations for the target ratio based on grain type or angle of the main conveyor; and
   a conveyor controller configured to receive a wireless signal from the mobile device and to control the speed of the main conveyor and the speed of the swing conveyor to achieve the target speeds or target ratio.

10. The system of claim 9, wherein the graphical user interface of the mobile device presents a user interface element to set a flow control mode in which the conveyor controller varies the speed of the swing conveyor based on a target flow rate and based on signals from level sensors in a hopper or from a signal from a material flow rate sensor.

11. The system of claim 9, wherein the system further comprising a keypad connected to the conveyor controller to manually control the speeds of the main conveyor and of the swing conveyor.

12. The system of claim 9, wherein the swing conveyor comprises a hydraulic motor and a solenoid valve connected to the motor, wherein the solenoid valve is driven by a drive signal from the conveyor controller.

13. A method of operating a swing conveyor that conveys material via a transition hopper to a main conveyor, the method comprising:
   sensing a material level of the material in the transition hopper using a material level sensor;
   sensing one or more of a material flow rate, belt slippage, conveyor angle, and material rollback;
   generating one or more feedback signals using the material level sensor and also based on the one or more of the material flow rate, belt slippage, conveyor angle, and material rollback;

receiving the one or more feedback signals by a conveyor controller; and selectively controlling, using the conveyor controller, either or both the speed of the swing conveyor and the speed of the main conveyor in response to the one or more feedback signals.

14. The method of claim 13, wherein the method comprises sensing only the material level and the belt slippage.

15. The method of claim 13, wherein the method comprises sensing only the material level and the conveyor angle.

16. The method of claim 13, wherein the method comprises sensing only the material level and the material rollback.

17. The method of claim 13, wherein the method further comprising displaying on a mobile device a graphical user interface to receive user input specifying a target speed of the swing conveyor, specifying a ratio of the speed of the main conveyor to the speed of the swing conveyor, or specifying an automatic mode to automatically control the conveyor speeds based on feedback signals.

18. The method of claim 17, wherein the method further comprising displaying recommendations for the target ratio based on grain type or angle.

19. The method of claim 13, wherein the method comprises sensing only the material level and the material flow rate.

* * * * *